E. POPE.
TELEGRAPH APPARATUS.
APPLICATION FILED JUNE 25, 1910.
1,043,865.
Patented Nov. 12, 1912.
6 SHEETS—SHEET 2.
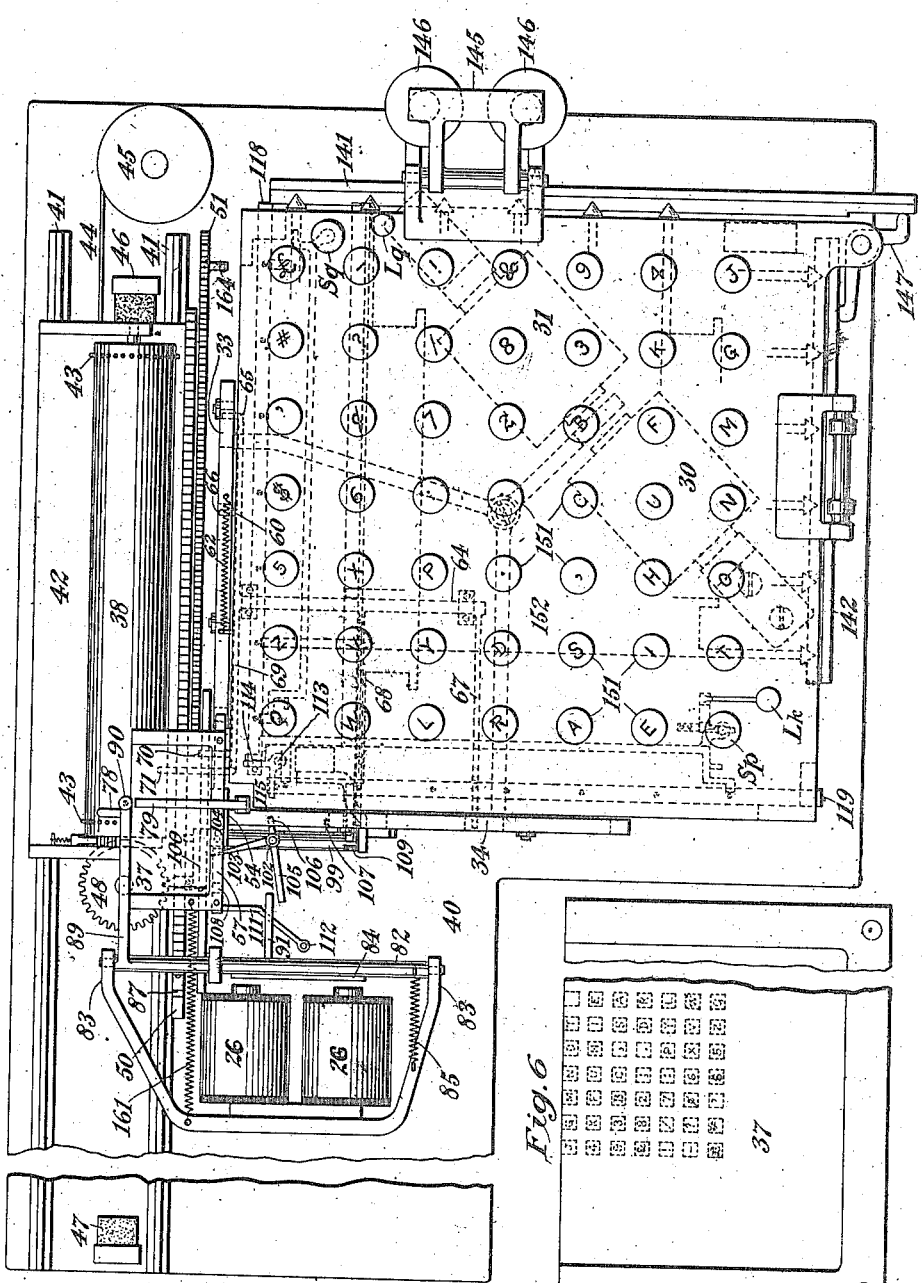
Witnesses:
Howard M Ross
William H. Mohr
Inventor:
Edwin Pope.
by Andrew Wilson.
his Attorney.

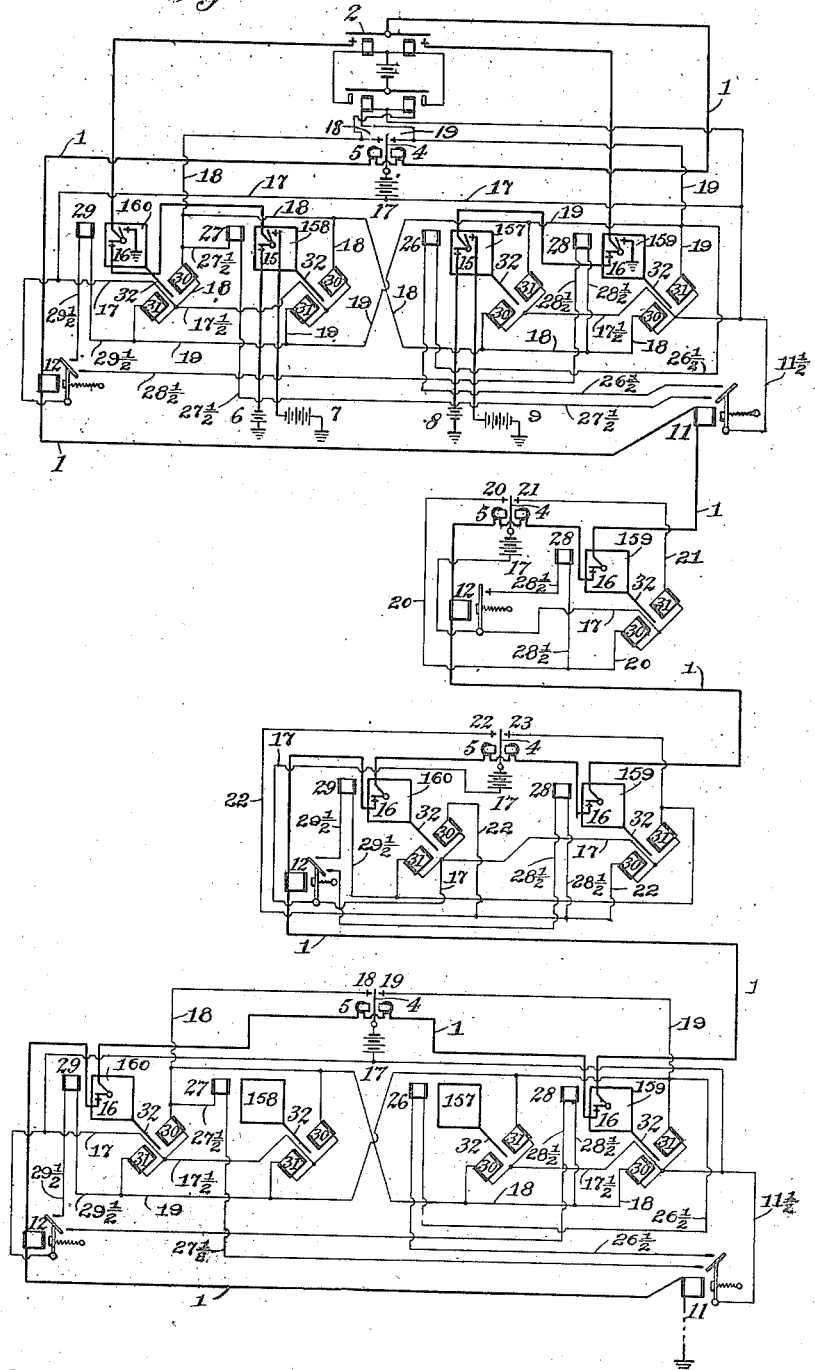

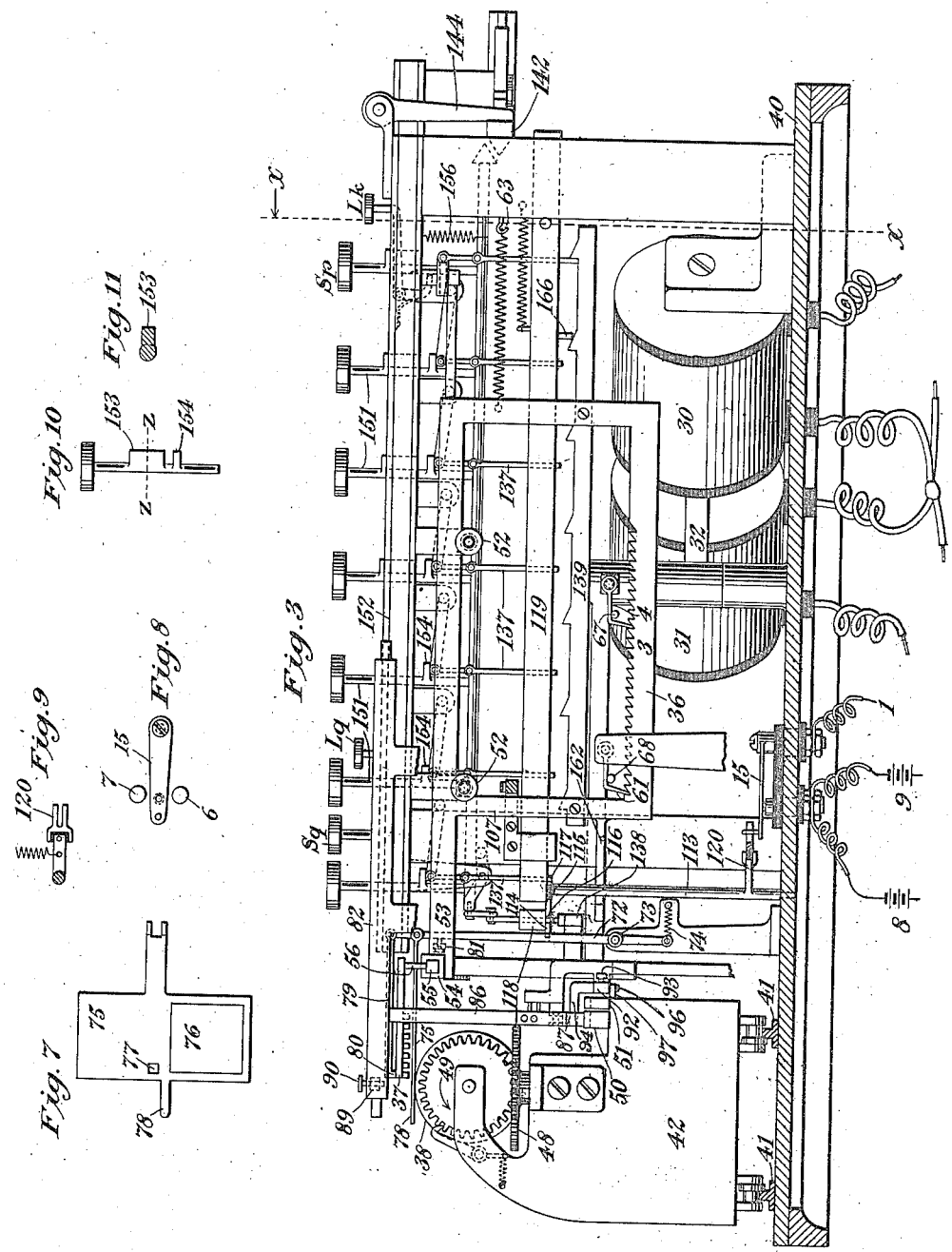

E. POPE.
TELEGRAPH APPARATUS.
APPLICATION FILED JUNE 25, 1910.
1,043,865.
Patented Nov. 12, 1912.
6 SHEETS—SHEET 4.
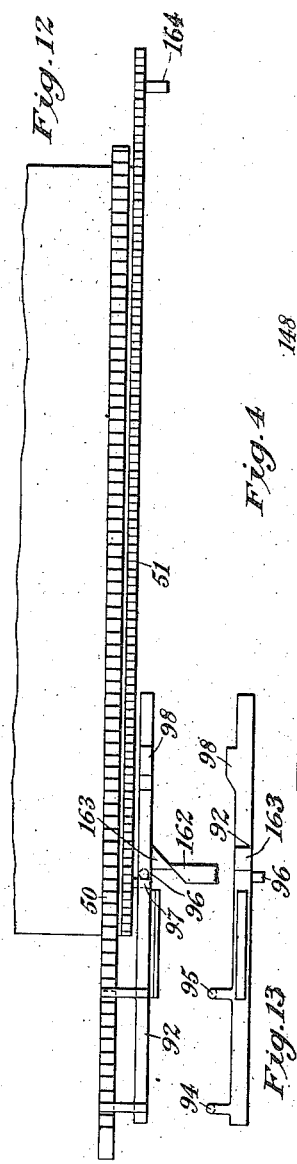
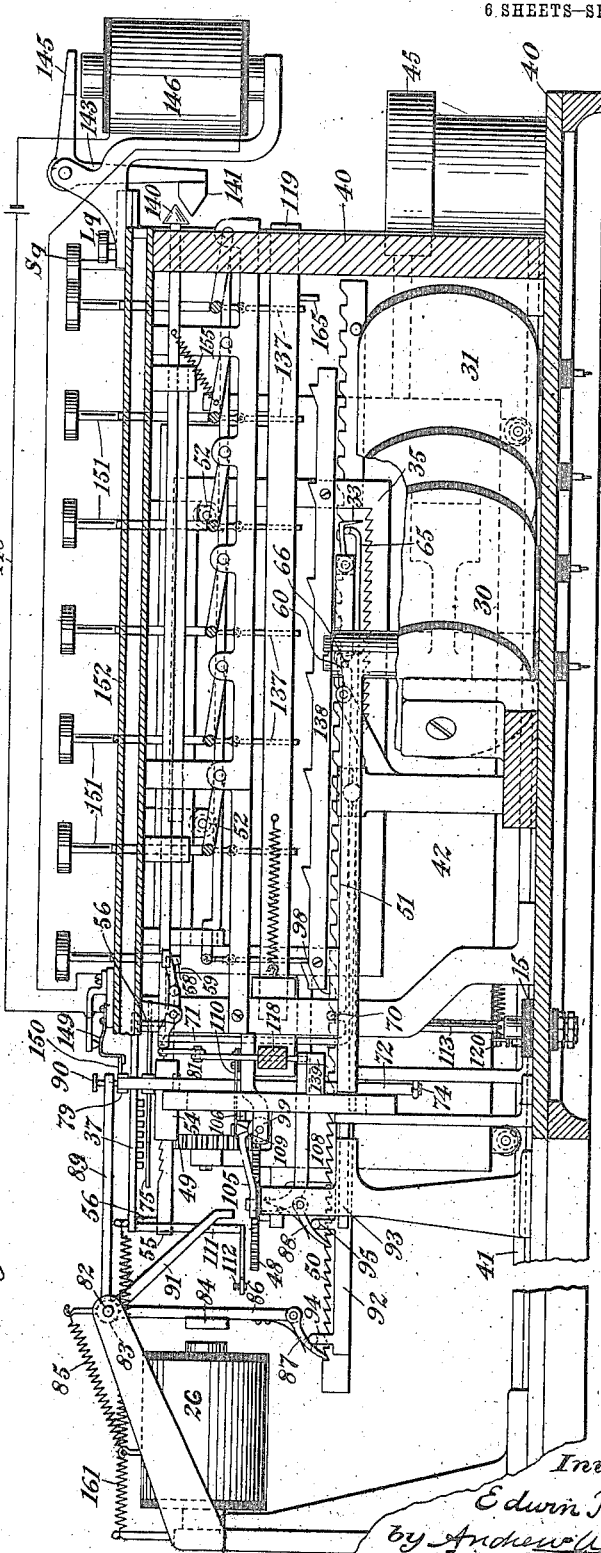
Witnesses.
Howard M Cox
William H. Mohr
Inventor.
Edwin Pope.
by Andrew Wilson.
his Attorney.

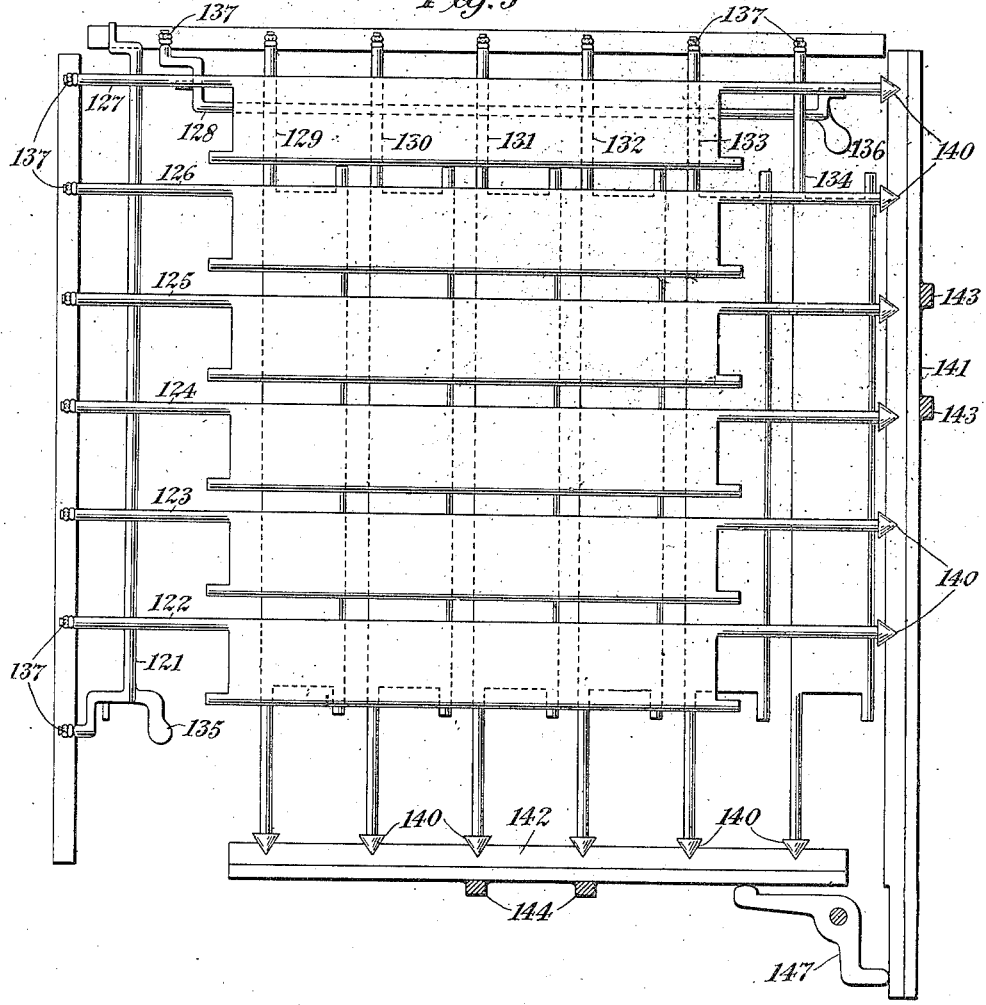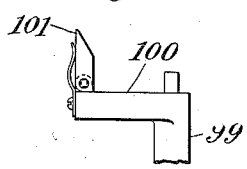

E. POPE.
TELEGRAPH APPARATUS.
APPLICATION FILED JUNE 25, 1910.
1,043,865.
Patented Nov. 12, 1912.
6 SHEETS—SHEET 6.
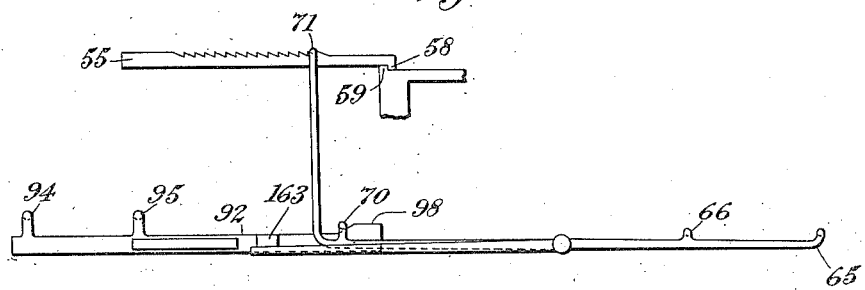
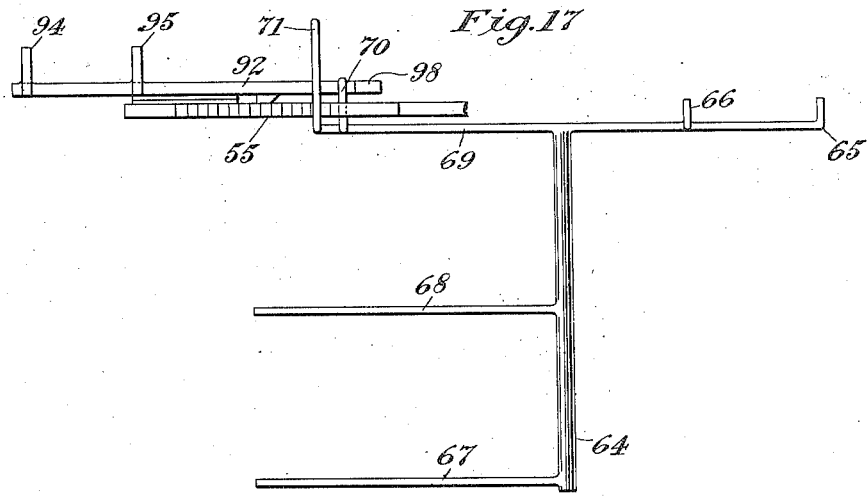
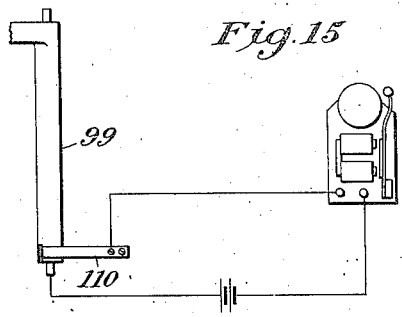
Witnesses:
Inventor:
Edwin Pope.
by Andrew Wilson
his Attorney.

UNITED STATES PATENT OFFICE.

EDWIN POPE, OF QUEBEC, QUEBEC, CANADA.

TELEGRAPH APPARATUS.

1,043,865.  Specification of Letters Patent.  Patented Nov. 12, 1912.

Application filed June 25, 1910. Serial No. 568,766.

*To all whom it may concern:*

Be it known that I, EDWIN POPE, a subject of the King of Great Britain, residing at Quebec, in the Province of Quebec and Dominion of Canada, have invented certain new and useful Improvements in Telegraph Apparatus, of which the following is a specification.

My invention relates to a telegraph apparatus adapted for use in transmitting a number of messages speedily over one wire by the direct action of the sending operators, without any previous preparation or handling, and whereby the messages are recorded, preferably in print, directly by the receiving instruments as well as by the sending instruments; and my improvements consist in the particulars hereinafter pointed out and claimed.

My improved apparatus is particularly adapted for use in connection with a telegraph system which I have described and claimed in an application for Letters Patent of the United States to be filed simultaneously herewith, Serial No. 568,767 and I will not, therefore, describe that system herein, further than is desirable to clearly explain the working of the telegraphing apparatus.

In the drawings Figure 1 illustrates a system in connection with which my improved apparatus is adapted to be used, and embracing a terminal station and three intermediate way stations with their appropriate instruments and connections; Fig. 2 is a top view of the sending and receiving machines; Fig. 3 is an elevation of the same looking to the right on Fig. 2, part of the printing and feeding apparatus being broken away; Fig. 4 is an elevation, partly in section, looking from front to back on Fig. 2, and taken on the line X X of Fig. 4; Fig. 5 a plan view of the key-board bars, the upper parts of the machine being entirely removed so that the relation of the bars may appear more clearly; Fig. 6 is a bottom view of the rubber type-plate; Fig. 7 is a plan view of the ink-pad plate; Fig. 8 is a plan view of the switch 15; and Fig. 9 is a top view of the lever-arm which operates that switch; Fig. 10 is a detail of one of the selector keys; Fig. 11 is a cross-sectional view of the same on the line Z Z; Fig. 12 is a top view, on an enlarged scale, of the rack bars for feeding the carriage and shifting the type-plate feed, and Fig. 13 is a side detail of the carriage feed and shift bar; Fig. 14 is a detail of the pawl arm for turning the paper roller; Fig. 15 is a diagram of the selective call connection; Fig. 16 is a detail of the movable pin in the office-call selector-arm; Fig. 17 is a plan view of the shift bar 64 and its connections, and Fig. 18 is a side view of the same.

Similar letters of reference designate similar parts in all the figures.

A main line 1, through a pole-changer 2, receives impulses from positive battery 6, strong positive battery 7, negative battery 8 and strong negative battery 9. The line has polar relays, 5, 5, closing, under the influence of positive impulses, the following circuits:—a circuit to the right through line 17, into and through and along line 18 and the loops found with it by lines 17½ and returning through line 18; a circuit out through line 17 and returning through line 20; a circuit out through line 17 and returning through line 22, such circuits in each case energizing the magnet or magnets 30 included therein. Under the influence of negative impulses the relays 5, 5, close the following circuits; a circuit out through line 17 to the left, along line 19 and the loops found with it by lines 17½ and returning through line 19; a circuit out through line 17 and returning through line 21; a circuit out through line 17 and returning through line 23; such circuits in each case energizing the magnet or magnets 31 included therein. With strong current, the neutral relays 11, will close their switches throwing the lines 26½, 26½, and 11½ into the local circuits 17, 17½ 19, and energizing the magnets 26; and also throwing the lines 27½, 27½ into the local circuits 17 17½, 18, and energizing the magnets 27. And the neutral relays 12, 12, will, with no current, release their armatures, cutting the lines 28½, 28½ into the local circuits 17, 17½, 18; 17, 20, and 17, 22, in each case energizing their magnets 28; and also cutting the lines 29½, 29½ into the local circuits 17, 17½, 19 and energizing their magnets 29.

The switches 15, 16 are controlled by the operators' machine.

The alternate cutting out and in of the local circuits by the armatures 4, 4, will cause the electro-magnets 30, 31, to vibrate their forked armature bars 32, 32, thereby producing mechanical power to drive the operators' machine, which I will now proceed to describe.

This machine is provided with a frame 40, having tracks 41, 41, upon which travels the carriage 42, which carries the paper roller 38, over which the paper, (not shown) travels, being preferably engaged and fed forward by the pins 43, 43 in the circumference of the roller 38, which pins may engage in corresponding perforations in the edges of the paper. The paper is preferably carried in the box-like interior of the carriage 42, and drawn up by the roller as it is printed. The carriage is drawn to the right by a flexible band 44 and a spring drum 45, or a cord and weight may be used if desired. 46 and 47 are stops, preferably provided with elastic bumpers, to arrest the carriage at the limits of its travel. 48 is a ratchet wheel, gearing with the wheel 49 on the end of the paper roller, and by which the paper roller is turned. The carriage is provided with a toothed feed rack 50 and with a shift rack 51, the feed rack being provided with two teeth for each tooth in the shift rack. The rack bars 35 and 36 are mounted so as to move easily to and fro in the frame of the machine. I have shown the rack bars as the lower members of rectangular frames traveling upon antifriction rollers 52, 52, but the method of mounting these bars may be modified so long as they are free to move readily to and fro, under the influence of the arms of the Y bar 32. The frame of the rack bar 36 is extended at 53 and carries a cross-head 54 through which slides a toothed bar 55 to which are attached arms 56 carrying the type-plate 37, which, as stated, is of rubber with the type molded upon the under side thereof, and which has a suitable carrying frame 57 around three sides thereof. This arrangement allows the type-plate to be drawn laterally in its relation to the rack 36. One end of the rack bar 55 is provided with a downwardly projecting hook 58 which encounters an upward projection 59 on the rack frame 35, so that when the frame 35 is drawn to the right it will draw the type-plate frame with it, but will be free to return to its initial position without carrying the type-plate frame back with it. 60 and 61 are detents for holding the racks 35 and 36 in the positions to which they are advanced by their pawls 33 and 34, and 62 and 63 are springs for returning the racks 35 and 36 to their initial positions.

A shaft 64, is mounted in the machine and is provided with an arm 65 extending beneath the pawl 33, an arm 66 extending beneath the detent 60, and is also provided upon its opposite side with an arm 67 extending beneath the pawl 34, and an arm 68 extending beneath the detent 61. This shaft 64 also has an arm 69 from which extends a finger 70, traveling upon the shift-rack 51, and 69 is extended upward and laterally into a finger 71 which engages with the teeth of the rack-bar 55. It will be seen, therefore, that when the shaft 64 is rocked, as it will be by the passing of the shift-rack 51 under the finger 70, which will alternately ride over the teeth of the rack 51 or fall between them, the arms upon the opposite sides of the shaft 64 will be alternately raised and lowered, correspondingly lifting the pawls and detents controlled by them out of contact with their respective racks or dropping them into contact therewith, while the finger 71 will be alternately raised free of and dropped into contact with the rack 55.

An arm 72 is pivoted at 73 to part of the frame work of the machine, its lower end being connected with a spring 74, under the influence of which the upper end of the arm is thrown forward. This arm 72 has pivoted to it near its upper end a plate 75 which is provided upon its upper surface with an ink-pad 76, against which the type of the type-plate 37 rub to obtain their ink, an opening 77 through which the type is struck down against the paper, and a guide finger 78 which rests on top of the paper roller to support the plate 75. An arm 79 is hinged to the top of the arm 72 and extends forward over the type-plate and is provided with a downwardly projecting end 80 which rests above the type letter when the letter has been brought into position to be printed. The arm 72 is normally held back against the action of the spring 74 by the pin 81 in the end 53 of the rack frame 36; but it is released and allowed to swing forward as soon as the rack frame 36 is fed forward by the pawl 34 of the Y bar, 32.

A shaft 82 mounted in suitable bearings 83, 83, in the frame of the machine carries the armature bar 84 which is drawn forward by the electro-magnet 28, against the resistance of the spring 85. The arm 86 attached to the shaft 82 carries the pawl 87 engaging with the rack bar 50 and drawing the bar 50 forward one tooth at a time under the impulses of the electro-magnet 28, the bar and its carriage being held against the tension of the spring drum 45 by the detent 88 pivoted to the frame of the machine. From the shaft 82 extends the hammer arm 89 the end of which is adapted to extend over and strike down the end of the arm 79 to force the latter against the type-plate and print the letter upon the paper at the proper instant. A set screw 90 is threaded through the end of the hammer arm 89 so as to give the proper adjustment relative to the arm 79. The shaft 82 also carries the arm 91 which forms part of the selective call mechanism, as I will afterward explain. A bar 92 slides in a suitable guide 93 in the frame of the machine and carries an arm 94 extending beneath the pawl 87, an arm 95 extending beneath the detent 88, a pin 96 adapted to engage with the pin 97 on the carriage 42, and a flange 98 having a forwardly inclined shoulder and being adapted to be drawn underneath and to raise the finger 70 and thereby rock the shaft 64 and its connections, at the proper time. A shaft 99 is pivoted to bearings in the frame of the machine and carries an arm 100, the end of which is provided with a pivoted pawl 101 which is adapted to engage with the toothed wheel 48 and to turn it one cog when the carriage reaches the limit of its travel to the right, the pawl 101 yielding to allow the return of the wheel 48 past it when the carriage is fed back to the left. Upon the shaft 99 is also pivoted the bell crank 102, the arm 103 of which is adapted to engage with the pin 104 in the shaft 99 while the arm 105 will be swung beneath the end of the arm 91 carried by the shaft 82. The inner end 106 of the bell crank 102, will be engaged by the forward edge of the rack-frame 36 when the rack-frame is fed forward, while the arm 103 will be engaged by the extension 108 of the rack-bar frame 35 when that rack bar is fed to the right.

The shaft 99 is provided with an insulated portion 109 and an insulated spring arm 110 bears with its point upon the periphery of the shaft 99 and rests upon the shaft or upon the insulated portion thereof so as to open or close a local circuit and ring a call bell, as shown diagrammatically in Fig. 15. The pressure of the spring arm 110 is sufficient to temporarily hold the shaft 99 in the position to which it may be turned from time to time in the operation of the machine. From the type-plate frame is extended an arm 111 which is differently positioned upon the different type plates, the arm of each type-plate being so positioned that when a certain letter, which is the distinctive letter of that particular machine, is brought into position to be printed, the movable pin 112 in the end of the arm 111 will be interposed between the end of arms 91 and 105, so that when the arm 91 is depressed it will press the movable pin down against the end of arm 105 and depress that also and rock the shaft 99 with the results hereinafter pointed out.

In suitable bearings is mounted the shaft 113, carrying at its top arms 114 and 115 against which bear the pins 116 and 117 in the ends of the bars 118 and 119 which slide in guides in the machine. At its lower end the shaft 113 carries the arm 120 which controls the switch 15, so as to connect the main line wire 1 with the lines from batteries 8 and 9 respectively, as the switch moves to one or other of the stops.

In the framework of the machine are arranged two sets of pivoted bars which are each composed of seven members, the upper set being numbered 121 to 127 inclusive and the lower set being numbered 128 to 134 inclusive, the several bars being similar in construction, except in the cases of 121 and 128 which are extended under the other bars of their own series so that they will be rocked and their pin ends raised by the depression of any of the bars of their own series. Besides this, the bar 121 carries an arm 135 and the bar 128 carries an arm 136 through which they can be operated independently of the other bars. These bars carry at their several ends pins 137, 137 which are pivoted thereto and may be formed of one piece, or, if desired, jointed, as shown in the drawings. These pins extend down through holes in the respective bars 118 and 119, and it should be observed that these bars may be made much thinner than shown in the drawings and may be, in fact, simply plates with holes therethrough to permit the passage of the pins.

To the sides of the rack frames 35 and 36 are attached toothed racks 138 and 139, the first tooth in each rack being normally in engagement with the first pin 137 of its series, the next tooth being one feed-space of the racks 35 or 36 behind its corresponding pin, the third tooth being two such feed-spaces behind its corresponding pin, and so on to the end of the series, the last tooth being six feed-spaces removed from its pin 137.

The pivoted bars 122 to 127 inclusive and 129 to 134 inclusive have their ends opposite to the pins 137 furnished with conical heads 140, 140, which are adapted to pass above and below the locking bars 141 and 142 of their respective series, the locking bars being carried by arms 143, 143 and 144, 144 pivoted in suitable bearings in the frame, the bar 141 being adapted to be swung in so as to lock above or below the conical heads 140 by the action of its armature 145 under the influence of the electromagnet 146, the bar 141 communicating its movement to the bar 142 through the bell crank 147 mounted in the frame of the machine. The electro-magnet 146 is energized by a local circuit 148, which is normally closed, but which is broken by the depression of spring 149, through an extension 150 from the arm 79, when the arm 79 is carried down by the printing hammer 89.

Piston keys 151, 151 slide through openings in the top 152 of the frame. I have shown the top of the frame as composed of two parallel plates which afford length of bearing for the key shanks and lightness of construction. But this arrangement may be modified so long as suitable guides are provided for the shanks of the keys, which, preferably, are provided with flanges 153 to prevent rotation, and which have lateral arms 154.

The arms 154 of the keys 151 rest upon the upper tier of locking bars, if any, directly beneath the respective keys, while the lower ends of the keys bear upon the locking bars of the lower series, if any, directly beneath them, so that when a key is depressed it will rock down the bar with which it is in contact, the bars being returned to their original positions, when released, by suitable springs as 155, 156, with one of which each bar is provided, although, for clearness, I have only shown one bar of each series as having such a spring. The row of keys designated as T to J bear only upon the lower series of bars, while the row of keys E to Q bear only upon the upper series of bars. The key S$p$ is a special key, provided with a spring catch, as shown, for rocking down the bar 121 and locking it with its pin raised, the bar being released through the depression of the key L$k$; and a similar special key S$q$ with its unlocking key L$q$ controls the arm 136 of the locking bar 128 so as to rock it down and lock it with its pin 137 raised.

I will now describe the process of sending and receiving messages over the line by the operators' machine.

The main line is grounded at one end and reversals are sent into it at the other end from the batteries 6 and 8 through the pole-changer 2. The key-boards of the sending machines are ready for use by the operators while the recording apparatus of each receiving machine is freed from its key-board by the locking down of the special keys S$p$ and S$q$. The operator of one machine, as for instance 157, desires to send a message to the operator of the corresponding machine 157 at the other end of the line. The Y bar 32 of machine 157 is being vibrated by the magnets 30 and 31, being drawn toward 30 when the local circuit 17, 18, is closed by the positive main line current operating the armature 4 through the polar relay 5 and being drawn toward 31 when the negative impulses close the local circuit 17, 19, by drawing the armature 4 in the opposite direction. The sending operator presses the key to form his first letter, as for instance "C", which rocks down the locking bars 123 and 131, dropping their pins 137 into the tracks of the rack bars 138 and 139 and raising the pins 137 of the bars 121 and 128 out of the tracks of those rack bars. The ratchet 33 is in engagement with the rack 35, and, under the impulses of the Y bar, will feed the rack 35 four spaces forward, the last step bringing it against the pin 137 of locking bar 131, pressing the pin forward, carrying with it the bar 119 and causing it through the pin in its end engaging with the arm 114 on shaft 113 to turn the switch 15 so that the next negative impulse will be delivered from the strong battery 9, with the result of causing the neutral relay 11 to bring the electro-magnet 26 into the local circuit 17, 19, drawing forward the armature 84, arm 86 and pawl 87, feeding the rack 50, and with it the carriage and the rack 51, one space to the left, and causing the finger 70, which has been resting upon the top of one of the teeth of rack 51, to drop into the next space between the teeth, allowing the finger 71 to drop into engagement with the teeth of the type-plate rack 55, rocking the shaft 64, raising the arm 65 and its branch 66 and lifting the pawls 33 and 60 out of engagement with the rack 35, and allowing that rack and its connections to return to its initial position, under the influence of spring 62, lowering the arms 67 and 68 and dropping the pawls 34 and 61 into engagement with the rack 36, the normal battery connection being restored by the return of the switch to its original position under the influence of the spring shown as connected thereto. The rack 36 is then fed forward by the pawl 34 three spaces, the last feed bringing the tooth of rack 39 against the pin 137 of bar 123 and pushing forward its bar 119 and causing it, through the bell-crank arm 115, to again turn the switch 15 so that the next negative impulse is delivered from the strong battery 9.

The forward movement of the rack frame 36 has permitted the arm 72 to be thrown forward bringing the type-hole in the ink-pad plate into printing position over the paper roller and also bringing the arm 79 into position over the hole. The type-plate, which was drawn to the right by the movement of rack 35 and held there by the finger 71 engaging with its rack 55, has now been pushed forward by the movement of the rack frame 36, its type being inked by contact with the ink-pad, and its type "C" being in position over the hole 77 in the ink-pad plate. A strong negative impulse again brings the electro-magnet into the local circuit, and through the armature 84, arm 86, and ratchet 87, feeds the rack 50 one space forward, rocks the shaft 83 and causes the hammer arm 89 to bring its pin 90 down upon the end of arm 79, forcing its extension 80 down on top of the type plate, pressing the letter "C" through the hole 77, against the paper, and, just as the forward movement of the carriage stops, printing the letter. The last feed of the rack 50 carries with it the rack 51, raising the finger 70 on the top of the next tooth of rack 51, raising 70 and also raising 71 to free the type-plate rack 55, rocking shaft 64, dropping pawls 33 and 60 into engagement with rack 35 and raising pawls 34 and 61 out of engagement with rack 36, allowing rack-frame 36 to return to its initial position, carrying back with it the type plate 37 which is also moved laterally by the spring 161 into its initial position, and allowing the switch 15 to return to the low battery connection.

Before the letter "C" has been completed, the operator has pressed upon the key of the next letter, as for instance "H." The conical heads 140 of the bars 122 and 130 engaged by key "H" encounter the upper sides of the locking bars 141 and 142 and can not be sent past them because the bars are locked inward by the control of electromagnet 146 through the armature arm 145. But at the instant that the printing hammer 89 strikes down the arm 79, with its extension 150, the local circuit 148 is broken, by the pressing of the spring 149 away from its stop, and the locking bars 141 and 142 are released and allowed to swing outward under the pressure of the conical heads of locking bars 122 and 130, the heads of bars 123 and 131 at the same instant passing up past the locking bars 141 and 142 and assuming their normal position, the local circuit 148 being closed by the raising of arm 79, and the bars 141 and 142 being locked inward so as to hold the combination for the letter "H" until that letter has been printed.

If the operator does not depress a key, the pins 137 of bars 128 and 121, being down, will, each at the first feed of its respective rock bar, send a reversal into the line, with the result that the carriage will be fed forward one letter space, without any letter being printed, thus getting a space feed without the use of a special key.

While the operator of machine 157 has been sending his message, using the normal positive current for driving and the strong negative current for printing and shifting, the operator of machine 158 has been sending his message to the corresponding machine 158 at the other terminal station, using the normal negative current for driving and the strong positive current for printing and shifting; and the operator of a machine 159 has been sending his message to the corresponding machine 159, either at a way station or a terminal station, using the normal positive current for driving and an open circuit for feeding and printing; and the operator of a machine 160 has been sending his message to a corresponding machine 160, at a way station or a terminal station, using the normal negative current for driving and an open circuit for feeding and printing; so that four messages may be transmitted simultaneously over the same wire from the main station, or two messages may be sent from way stations while two other messages are being sent from the main station, the message being duplicated at each of the other stations which is provided with a machine corresponding to the sending machine.

I will now describe the selective call.

Each instrument on a wire is represented by a separate character on the type plate 37, and each type plate carries an arm 111, the lower end of which is so placed that when that machine's character is in position for printing, the movable pin in the end of the arm 111 will be directly beneath the end of the arm 91.

To call a station the special key Sq is depressed and the rack 35 is moved eight spaces to the right which brings its arm 108 against the bell-crank arm 103 and draws it back against the stop 104 putting the other end 105 of the bell-crank under the arm 91. The same movement rocks the shaft 99 and raises the pawl 101 out of engagement with the wheel 48. With the eighth step, the pin 165 engages the forward tooth of the rack 138, turning the switch 15 and shifting the feed, and allowing the rack frame 36 to be fed forward one step till its last tooth engages the pin 137 of bar 121, turning the switch 15, shifting the feed to rack 35 and returning the type-plate to first position. All the machines on the line are now adjusted to receive a call. The letter of the machine wanted is now sent and it brings the pin 112 of arm 111 between the ends of arms 91 and 105, and at the stroke of the printing hammer the arm 91 at the called station will encounter the pin 112 and drive it down against the arm 105, rocking the shaft 99 and bringing the pawl 101 of that machine into connection with the wheel 48, so as to rotate the paper roller, when the carriage reaches the end of its travel to the left. The rack 36 is now allowed to make eight forward movements when its point 107 will meet the bell-crank arm 106 and move the arm 105 out of reach of pin 112, without rocking shaft 99. This unships the call at all the machines, the calling and called machines being the only ones which have the feed pawl 101 in operation and the only ones upon which the paper roller will be turned and the paper fed forward so as to receive and record a clear message, as will be done on both the sending and receiving machines. At the other stations the carriage is carried to and fro, but as the paper is not fed forward the same line will be printed repeatedly and will be illegible.

When a line has been printed the pin 164 on rack 51 strikes the end of the shift bar 92 pushing it forward and lifting the pawls 87 and 88 free from rack 50 and also lifting finger 70 out of engagement with rack 51, and allowing the carriage to be drawn rapidly back by the spring drum 45; and just before the carriage reaches the end of the track its pin 97 strikes the pin 96 on shift bar 92, moving the shift bar 92 back, dropping pawls 87 and 88, and, by dropping the finger 70 on to the rack 51, putting the pawl 33 into driving connection with the rack 35. This movement of the carriage also turns the paper roller, as I have already described.

If a message is to be sent to several stations simultaneously they can be called by sending their distinguishing letters one after the other before unshipping the call apparatus by the eight forward movements of rack 36 as just described.

When a message is completed the selective call of the receiving machine can be thrown out by repeating eight forward movements of rack 36.

To call the attention of the operator at a station, a call bell, as shown in Fig. 16, is placed in a local circuit which is closed by the spring 110 passing from the insulation 109 to the metal of shaft 99, when that shaft is rocked by the down stroke of the arm 91 as above described.

By allowing a series of uniform reversals to go into the line, without change, all the machines are brought into unison, those having their driving pawls working on rack 35 going to the eighth tooth and remaining with their ratchets acting continuously thereupon, while those machines whose driving pawls are engaged with racks 36 will feed those racks forward eight steps pressing their bevel ended arms 162, which extend from the rack frames 36, against the inclined lugs 163 of the shift bars 92, moving the shift bars and changing the feed to racks 35 which will then be fed eight movements to the right to the same position as the others.

A line feed may be accomplished, through arm 162 and lug 163, at any time, by depressing the special key Sp. and allowing the feed to be shifted, by the pin 137 of bar 128, to rack 36 and then feeding the rack 36 forward eight steps, moving the shift bar 92, through arm 162 and lug 163, and, with the conclusion of the movement, moving switch 15 and shifting the feed, by the engagement of the last tooth of rack 139 with the pin 166 in bar 119, whereby the sending mechanism will be brought back to first position.

The finger board of the machine is preferably placed diagonally in front of the operator with the most used characters nearest to him so that the fewest possible movements of the Y bar will be required to bring them into printing position. I have shown the preferred arrangement of the characters on the key-board and on the type-plate, and it will be noted that, when viewed from above, as in Figs. 2 and 6, the relative positions of the key-letters and the type-plate letters is reversed, in order to bring the latter into proper printing position.

Various modifications may be used without departing from the spirit of my invention. Thus the weights or other mechanical equivalents might be substituted for the springs which I have shown for moving the various parts, and parts might be transposed or relatively reversed without materially altering the scope of my novel ideas.

Having thus described my invention, what I claim and desire to secure by Letters Patent of the United States is:—

1. The combination, in a telegraphing apparatus, of a relatively adjustable type plate and platen, mechanism projected and retrieved by electrical reversals of the same strength, means actuated by said mechanism for effecting the adjustment of said type plate, relative to said platen, in two directions at an angle to each other but in the same plane, and means, actuated by a change in a mechanism-retrieving, electrical impulse, to move a character upon the type plate at right angles to the aforesaid plane of movement, to bring it into printing relation with the platen.

2. The combination, in a telegraphing apparatus, of a relatively adjustable type plate and platen, mechanism projected and retrieved by electrical reversals of the same strength, means actuated by said mechanism for effecting the adjustment of said type plate, relative to said platen, in two directions at an angle to each other but in the same plane, and means, actuated by an increase or decrease in a mechanism retrieving, electrical impulse, to move a character upon the type plate at right angles to the aforesaid plane of movement, into printing relation to the platen, and to feed the platen.

3. The combination, in a telegraphing apparatus, of a platen, a type plate, a vibrating armature bar communicating movements in two directions in the same plane to the type plate, means, actuated by a change in an armature actuating impulse, to alter the direction of the type plate's movement, and means similarly actuated to bring the type plate and platen into printing relation.

4. The combination, in a telegraphing apparatus, of a platen and a type plate, ratchet bars for moving the type plate in two directions in the same plane, and a vibrating, armature-bar engaging said ratchet bars successively to adjust the type plate relative to the platen.

5. The combination, in a telegraphing apparatus, of a platen and a type plate, ratchet bars for moving the type plate in two directions in the same plane, and a vibrating, armature-bar engaging through pawls said ratchet bars successively to adjust the type plate relative to the platen.

6. The combination, in a telegraphing apparatus, of a platen and a type plate, ratchet bars for moving the type plate in two directions in the same plane, and a vibrating, armature-bar having arms provided with pawls engaging said ratchet bars successively to adjust the type plate relative to the platen.

7. The combination, in a telegraphing apparatus, of a platen and a type plate, a ratchet bar carrying said type plate in laterally adjustable connection thereupon, a second ratchet bar engaging said type plate to effect such lateral adjustment, and a forked, vibrating armature-bar having pawls upon its arms adapted to engage successively with said ratchet bars to adjust the type plate relative to the platen.

8. The combination, in a telegraphing apparatus, of a platen and a type plate, a ratchet bar carrying said type plate in laterally adjustable connection thereupon, a second ratchet bar engaging said type plate to effect such lateral adjustment, a forked, vibrating armature-bar having pawls on its arms adapted to engage successively with said ratchet bars to adjust the type plate relative to the platen, and means, actuated by a change in an armature vibrating impulse, for making and breaking connection, alternately between the pawls and the ratchet bars.

9. The combination, in a telegraphing apparatus, of a platen and a type plate, a ratchet bar carrying said type plate in laterally adjustable connection thereupon, a second ratchet bar engaging said type plate to effect such lateral adjustment, detent pawls engaging said ratchet bars, a forked, vibrating armature-bar having pawls upon its arms adapted to engage successively with said ratchet bars to adjust the type plate relative to the platen, and means, consisting of arms carried by a rocking shaft and adapted to be actuated by a change in an armature vibrating impulse, for making and breaking connection, alternately, between the detent pawls and driving pawls and the ratchet bars.

10. The combination, in a telegraphing apparatus, of a platen and a type plate, a ratchet bar carrying said type plate in laterally adjustable connection thereupon, a second ratchet bar engaging said type plate to effect such lateral adjustment, a forked vibrating armature-bar having pawls on its arms adapted to engage successively with said ratchet bars to adjust the type plate relative to the platen, means, actuated by a change in an armature vibrating impulse, for making and breaking connection, alternately between the pawls and the ratchet bars, and means for returning said ratchet bars to their initial positions when released from their respective pawls.

11. The combination, in a telegraphing apparatus, of a platen and a type plate, a ratchet bar carrying said type plate in laterally adjustable connection thereupon, a second ratchet bar engaging said type plate to effect such lateral adjustment and then release it, means for holding the type plate in its lateral position, and a forked, vibrating armature-bar having pawls upon its arms adapted to engage successively with said ratchet bars to adjust the type plate relative to the platen.

12. The combination, in a telegraphing apparatus, of a platen and a type plate, a ratchet bar carrying said type plate in laterally adjustable connection thereupon, a second ratchet bar engaging said type plate to effect such lateral adjustment and then release it, means, consisting of an arm carried by a rocking bar, for holding the type plate in its lateral position, and a forked, vibrating armature-bar having pawls upon its arms adapted to engage successively with said ratchet bars to adjust the type plate relative to the platen.

13. The combination, in a telegraphing apparatus, of a platen and a type plate, provided with a ratchet rack, a ratchet bar carrying said type plate in laterally adjustable connection thereupon, a second ratchet bar engaging said type plate to effect such lateral adjustment and then release it, means, consisting of an angle arm slidably engaging with the type-plate ratchet-rack carried by a rocking bar, for holding the type plate in its lateral position, and a forked, vibrating armature-bar having pawls upon its arms adapted to engage successively with said ratchet bars to adjust the type plate relative to the platen.

14. The combination, in a telegraphing apparatus, of a platen and a type plate, movable members for shifting the type plate in two directions in the same plane, mechanism actuated by electrical reversals to move said members, and selective stops to engage said movable members at arbitrarily determined positions and produce a change in an actuating electrical impulse to alter the direction of the type plate adjustment.

15. The combination, in a telegraphing apparatus, of a platen and a type plate, movable members for shifting the type plate in two directions in the same plane, mechanism actuated by electrical reversals to move said members, and selective stops to engage said movable members at arbitrarily determined positions and, by a switch, opened by said movable member to produce a change in an actuating electrical impulse altering the direction of the type plate adjustment.

16. The combination, in a telegraphing apparatus, of a platen, a type plate, movable members for shifting the type plate in two directions at an angle to each other but in the same plane, an armature vibrated by a continuous series of impulses of opposed polarity to successively actuate said movable members, and stops to engage the same at selected positions, and means, operated thereby, affecting the circuit supplying one class of electrical impulses to alter the direction of the type plate adjustment.

17. The combination, in a telegraphing apparatus, of a flexible type plate, a metallic inking plate and a platen provided with an absorbent pad, means for adjusting them relative to each other, and means for bringing the type plate and platen into printing relation.

18. The combination, in a telegraphing apparatus, of a flexible type plate, an inking plate provided with a type aperture, and a platen, means for adjusting them relative to each other, and means for bringing the type plate and platen into printing relation.

19. The combination, in a telegraphing apparatus, of a flexible type plate, a projectable inking plate provided with a type aperture, a projectable type depressor, a platen, means for adjusting them relative to each other, and means for bringing the type plate and platen into printing relation.

20. The combination, in a telegraphing apparatus, of a flexible type plate, a vibratable arm, carrying a projectable inking plate provided with a type aperture, and a projectable type depressor, a platen, means for adjusting them relative to each other, and means for bringing the type plate and platen into printing relation.

21. The combination, in a telegraphing apparatus of a platen provided with a carriage, a type plate, means actuated by electrical reversals for producing a relative adjustment of the type plate and platen, and means for modifying the strength of certain electrical impulses to govern the adjustment and to bring the type plate and platen into printing relation and to feed the platen carriage.

22. The combination, in a telegraphing apparatus, of a rotatable platen provided with a carriage, a type plate, means actuated by a continuous series of electrical reversals of uniform length for producing a relative adjustment of the type plate and platen, means for modifying the strength of certain of said electrical impulses, and means, actuated by such modified impulses, of said uninterrupted series of reversals, to govern the adjustment of and to bring the type plate and platen into printing relation and to feed the carriage and rotate the platen.

23. The combination, in a telegraphing apparatus, of a rotatable platen provided with paper engaging pins, a carriage, a type plate, means actuated by a continuous series of electrical reversals of uniform length for producing a relative adjustment of the type plate and platen, means for modifying the strength of certain of said electrical impulses, and means, actuated by such modified impulses of said uninterrupted series of reversals, to govern the adjustment of and bring the type plate and platen into printing relation, and to feed the carriage and rotate the platen.

24. The combination in a telegraphing apparatus, of a rotatable paper-platen provided with a rotating gear mounted in a movable rack, an electrically actuated pawl engaging with said rack to feed it step by step, a rack detent, a slide with fingers engaging beneath said pawl and detent and operated by said carriage to simultaneously raise said pawl and detent and thereby release said rack, and means for automatically returning said carriage to its initial position and, as the return movement is concluded, turning said platen by bringing said rotating gear into contact with a stop.

25. The combination, in a telegraphing apparatus, of a rotatable paper-platen mounted in a movable carriage provided with a toothed feed rack, an electrically actuated pawl engaging with said rack to feed it step by step, a track detent, means, consisting of a longitudinally movable bar provided with arms and slid forward by said carriage for releasing said track from said pawl and detent, and means for automatically returning said carriage, and through it said bar, to their initial positions, and restoring connection between said pawl, detent and track.

26. The combination, in a telegraphing apparatus, of a movable type plate, means for moving said type plate first laterally and secondly forward, a movable carriage carrying a platen, means for feeding said carriage a step simultaneously with the change from the first to the second movement of the type plate, and for bringing the type into printing relation to the platen simultaneously with the conclusion of the second type plate movement.

27. The combination, in a telegraphing apparatus, of a movable type plate, means, consisting of arms vibrated by electrical reversals, for moving said type plate first laterally and secondly forward, means for determining and altering the direction of the type plate movements by changing the character of an electrical reversal, a movable carriage carrying a platen, means, actuated by the changed electrical reversals, for feeding said carriage a step simultaneously with the change from the first to the second movement of the type plate, and for bringing the type into printing relation to the platen simultaneously with the conclusion of the second type plate movement.

28. The combination, in a telegraphing apparatus, of a type plate, ratchet bars for moving the type plate, ratchet bar detents, a vibrating armature-bar, actuated by current reversals, provided with pawls alternately engaging said ratchet bars to adjust the type plate successively in two directions, means for determining and altering the direction of the type plate movements by changing the character of an electrical reversal, a platen carriage provided with a feed rack and with a shift-governing rack, a shift shaft provided with arms governing said pawls and detents and rocked by said shift-governing rack, means, actuated by said changed electrical reversal for feeding said carriage a step, simultaneously with the first change of movement of the type plate, and actuating said shift shaft, and for, upon the second change of movement of the type plate, feeding said carriage a second step, printing the letter and again actuating the shift shaft.

29. The combination, in a telegraphing apparatus, of a type plate, ratchet bars for moving the type plate, ratchet bar detents, a vibrating, armature-bar, actuated by current reversals, provided with pawls alternately engaging said ratchet bars to adjust the type plate successively in two directions, means for determining and altering the direction of the type plate movements by changing the character of an electrical reversal, a platen carriage provided with a feed rack and with a shift-governing rack, a shift shaft provided with arms governing said pawls and detents and rocked by said shift-governing rack, means, actuated by said changed electrical reversal for feeding said carriage a step, simultaneously with the first change of movement of the type plate, and actuating said shift shaft, and for, upon the second change of movement of the type plate, feeding said carriage a second step, printing the letter and again actuating the shift shaft, and means for returning the type plate and ratchet bars to their initial positions.

30. The combination, in a telegraphing apparatus, embodying a platen, a type plate, transversely-operating plate-shifting members, actuated by electrical reversals and governed by a change in a reversal, and change selecting stops, of a system of stop governing keys whereby a selected letter is automatically brought into position and printed upon the depression of the corresponding key.

31. The combination, in a telegraphing apparatus, of the character described, of two series of superimposed and transversely disposed pivoted bars provided with selector stops, and a series of keys by the depression whereof the selector stops are positioned to determine the adjustment of a type plate so as to present the desired character at the printing point.

32. The combination, in a telegraphing apparatus, embodying a platen, a type plate, transversely-operating plate-shifting members, each provided with a series of selector points and actuated by electrical reversals and governed by changed reversals, of selector stops arranged in series, those of each series being adapted to be projected singly into the path of the corresponding series of selector points, and to be moved thereby so as to produce a change in an electrical reversal.

33. The combination, in a telegraphing apparatus, embodying a platen, a type plate, transversely-operating plate-shifting members each provided with a series of progressively arranged selector points and actuated by the electrical reversals and governed by changed reversals, of selector stops arranged in uniform series and those of each series being adapted to be singly projected into the path of the corresponding series of selector points and to be moved thereby so as to produce a change in an electrical reversal.

34. The combination, in a telegraphing apparatus, embodying a platen, a type plate, transversely-operating plate-shifting members each provided with a series of progressively arranged selector points and actuated by the electrical reversals and governed by changed reversals, and switch bars, of selector stops arranged in series and those of each series affecting a common switch bar and being adapted to be singly projected into the path of the corresponding series of selector points and to be moved thereby so as to move said switch-bar and thereby produce a change in an electrical reversal.

35. The combination, in a telegraphing apparatus, embodying a platen, a type plate, transversely-operating plate-shifting members each provided with a series of progressively arranged selector points and actuated by electrical reversals and governed by changed reversals, and switch bars, of selector stops transversely disposed series of pivoted selector bars carrying said selector stop and arranged in series and those of each series affecting a common switch bar and being adapted to be singly projected, by the rocking of said selector bars, into the path of the corresponding series of selector points and to be moved thereby so as to move said switch-bar and thereby produce a change in an electrical reversal.

36. The combination, in a telegraphing apparatus, embodying a platen, a type plate, transversely-operating plate-shifting members each provided with a series of progressively arranged selector points and actuated by electrical reversals and governed by changed reversals, and switch bars, of selector stops, selector bar keys, transversely disposed series of pivoted selector bars carrying said selector stop and arranged in series, and those of each series affecting a common switch bar and being adapted to be singly projected, by the rocking of said selector bars, through said keys, into the path of the corresponding series of selector points and to be moved thereby so as to move said switch-bar and thereby produce a change in an electrical reversal, and accomplish the automatic positioning and printing of the letters corresponding with the several keys.

37. The combination, in a telegraphing apparatus, embodying a platen, a type plate, transversely-operating plate-shifting members each provided with a series of progressively arranged selector points and actuated by the electrical reversals and governed by changed reversals, of selector stops arranged in uniform series and those of each series being adapted to be singly projected into the path of the corresponding series of selector points and to be moved thereby so as to produce a change in an electrical reversal, the first selector stop in each series being normally in the track of the corresponding selector point.

38. The combination, in a telegraphing apparatus, embodying a platen, a type plate, transversely-operating plate-shifting members each provided with a series of progressively arranged selector points and actuated by the electrical reversals and governed by changed reversals, of selector stops arranged in uniform series and those of each series being adapted to be singly projected into the path of the corresponding series of selector points and to be moved thereby so as to produce a change in an electrical reversal, the first selector stop in each series being normally in the track of the corresponding selector point, and being raised by the depression of any other stop of its series.

39. The combination, in a telegraphing apparatus, embodying a platen, a type plate, transversely-operating plate-shifting members each provided with a series of progressively arranged selector points and actuated by the electrical reversals and governed by changed reversals, of selector stops arranged in uniform series and those of each series being adapted to be singly projected into the path of the corresponding series of selector points and to be moved thereby so as to produce a change in an electrical reversal, and means to withdraw all said selector stops out of the paths of the selector points.

40. The combination, in a telegraphing apparatus, embodying a platen, a type plate, transversely-operating plate-shifting members each provided with a series of progressively arranged selector points and actuated by the electrical reversals and governed by changed reversals, of selector stops arranged in series and those of each series affecting a common switch bar and being adapted to be singly projected into the path of the corresponding series of selector points and to be moved thereby so as to move said switch-bar and thereby produce a change in an electrical reversal, each of said plate-shifting members being provided with a member adjusted to engage and move its switch bar after the selector points have passed beyond the range of the selector stops.

41. The combination, in a telegraphing apparatus, embodying a platen, a type plate, transversely-operating plate-shifting members, actuated by electrical reversals and governed by a change in a reversal, and change selecting stops, of a system of stop governing keys whereby a selected letter is automatically brought into position and printed upon the depression of the corresponding key, and means for locking the selector stops in position until the printing is completed.

42. The combination, in a telegraphing apparatus, embodying a platen, a type plate, transversely-operating plate-shifting members, actuated by electrical reversals and governed by a change in a reversal, and change selecting stops, of a system of stop governing keys whereby a selected letter is automatically brought into position and printed upon the depression of the corresponding key, and means for locking the selector stops in position until the printing is completed and then automatically releasing them.

43. The combination, in a telegraphing apparatus, of the character described, of a type plate, two series of superimposed and transversely disposed pivoted bars provided with selector stops and with locking ends, and a series of keys by the depression whereof the selector stops are positioned to determine the adjustment of the type plate so as to present the desired character at the printing point, and electrically controlled locking bars for engaging and holding said selector bars in the selected position until the letter is printed.

44. The combination, in a telegraphing apparatus, of the character described, of a type plate, two series of superimposed and transversely disposed pivoted bars provided with selector stops and with conical locking ends, and a series of keys by the depression whereof the selector stops are positioned to determine the adjustment of the type plate so as to present the desired character at the printing point, and electrically controlled beveled locking bars for engaging and holding said selector bars in the selected position until the letter is printed.

45. The combination, in a telegraphing apparatus of the character described, of a type plate, selector bars and a selector-bar governor, locked by a closed local circuit which is broken at the instant the letter is printed to release the printed combination and to receive a new one.

46. The combination, in a telegraphing apparatus, of the character described, of a type-plate carrying ratchet bar, a carriage feed tripping-bar, selector points, selector stops and a connection between the type-plate-carrying ratchet-bar and the carriage-feed tripping-bar whereby the carriage feed is tripped when the ratchet bar has carried its selector points beyond the range of the selector stops.

47. The combination, in a telegraphing apparatus, of a platen carriage provided with a ratchet rack, a pawl engaging with said rack to feed said carriage, a trip to release said pawl, means for returning said carriage to its initial position, a type-plate-carrying ratchet bar moving toward said carriage and adapted to actuate said pawl trip when the type plate has passed beyond its printing position.

48. The combination, in a telegraphing apparatus, of a platen provided with rotating gear and mounted in a carriage, a gear pawl carried on the arm of a rocking shaft, a bell crank pivoted on the side of the rocking shaft, a type-plate provided with a call arm having a movable pin therein, a pivoted hammer-arm carrying a call extension, an extension from the lateral plate-adjusting mechanism to turn said bell-crank into engaging position and rock said shaft, raising said gear pawl out of engagement, and means for depressing said hammer arm extension against the call-arm pin to thereby rock back said shaft and bring the gear pawl again into engagement.

49. The combination, in a telegraphing apparatus, of a platen provided with rotating gear and mounted in a carriage, a gear pawl carried on the arm of a rocking shaft, an insulated portion in said shaft, a spring closing a local electric circuit to sound a call when bearing upon the shaft, a bell crank pivoted on the side of the rocking shaft, a type plate provided with a call arm having a movable pin therein, a pivoted hammer-arm carrying a call extension, an extension from the lateral plate-adjusting mechanism to turn said bell-crank into engaging position and rock said shaft, raising said gear pawl out of engagement, and means for depressing said hammer arm extension against the call-arm pin to thereby rock back said shaft and bring the gear pawl again into engagement.

50. The combination, in a telegraphing apparatus, of a platen provided with rotating gear and mounted in a carriage, a gear pawl carried on the arm of a rocking shaft, an insulated portion in said shaft, a spring closing a local electric circuit to sound a call when bearing upon the shaft, a bell crank pivoted on the side of the rocking shaft, a type plate provided with a call arm having a movable pin therein, a pivoted hammer-arm carrying a call extension, an extension from the lateral plate-adjusting mechanism to turn said bell-crank into engaging position and rock said shaft, raising said gear pawl out of engagement, and means for depressing said hammer arm extension against the call-arm pin to thereby rock back said shaft and bring the gear pawl again into engagement and sound said call.

51. The combination, in a telegraphing apparatus embodying a rotatable platen and an adjustable type plate, of means for disconnecting the platen rotating mechanism, and means for automatically reconnecting it when the type plate is adjusted to a predetermined position.

52. The combination, in a telegraphing apparatus, embodying a rotatable platen and an adjustable type plate, of means for disconnecting the platen rotating mechanism, and means for automatically reconnecting it when the type plate is adjusted to a predetermined position and closing a local electric circuit to sound an alarm.

53. The combination, in a telegraph-system, of a plurality of machines each embodying a rotatable platen and an adjustable type plate with an independently positioned call member, means for simultaneously disconnecting the platen rotating mechanism of all the machines, means for bringing the type plate of a selected machine to a predetermined position when its call member will automatically reconnect the platen rotating mechanism.

54. The combination, in a telegraph system, of a plurality of machines each embodying a rotatable platen and an adjustable type plate with an independently positioned call member, means for simultaneously disconnecting the platen rotating mechanism of all the machines, means for bringing the type plate of a selected machine to a predetermined position when its call member will automatically reconnect the platen rotating mechanism and close an electric circuit to sound a call.

55. The combination, in a telegraph system, of a plurality of machines each embodying a relatively adjustable platen and type plate, and means for bringing them into printing relation, means controlled by each machine for adjusting the type plates of all the others and for causing two selected machines only to make a legible record.

56. The combination, in a telegraphing apparatus, embodying a type plate adjustable step-by-step in two directions by transversely moving members actuated by alternating electrical impulses, of movable stops for said transversely moving members arranged to bring the more commonly used letters on the typle plate into printing position with a minimum number of steps.

57. The combination, in a telegraphing apparatus, embodying a type plate adjustable step-by-step in two directions by transversely moving members actuated by alternating electrical impulses, of movable stops for said transversely moving members arranged to bring the more commonly used letters on the type plate into printing position with a minimum number of steps, and a rectangular key board governing said movable stops and having the more generally used keys grouped in the corner nearest the operator.

58. A telegraph printing apparatus, for use in an electric circuit transmitting a series of impulses varied by changes in the character of selected impulses, embodying a printing roller and a movable type plate adjustable laterally and forwardly to bring a particular character to the printing point over a printing roller, and to depress said type toward said roller and to rotate said roller and move it laterally.

59. The combination, in a telegraphing system employing a primary series of continuous electrical reversals, of a plurality of machines each embodying corresponding and relatively adjustable signal-receiving parts, means for arbitrarily moving the said adjustable parts of each machine out of unison with those of the other machines, and means, actuated by the uninterrupted normal action of said electrical reversals, for automatically bringing the said adjustable parts of all the machines into unison.

60. The combination, in a telegraphing system employing a primary series of continuous electrical reversals, of a plurality of machines each embodying relatively adjustable transmitting-receiving parts, means for moving the said adjustable parts of each machine out of unison with those of the other machines, and means, actuated by the uninterrupted action of said electrical reversals, for automatically bringing the said adjustable parts of all of said machines into and retaining them in unison.

61. The combination, in a telegraphing system employing a primary series of continuous electrical reversals, of a plurality of machines each embodying relatively adjustable receiving parts, means for moving the said adjustable parts of each machine out of unison with those of the other machines, and means, actuated by the uninterrupted action of said electrical reversals, for automatically bringing the said adjustable parts of all of said machines into and retaining them in unison.

62. The combination, in a telegraphing system employing a series of continuous electrical reversals, of a transmitting-receiving machine and a receiving machine each embodying corresponding and relatively adjustable parts, means for moving the said adjustable parts of each machine out of unison with those of the other machine, and means, actuated by the uninterrupted action of said electrical reversals for automatically bringing the said adjustable parts of both of said machines again into unison.

EDWIN POPE.

Witnesses:
HOWARD M. ROWE,
WILLIAM H. MOHR.